C. A. FLEMING.
HAY RAKE.
APPLICATION FILED MAY 12, 1911.
1,165,863.
Patented Dec. 28, 1915.
2 SHEETS—SHEET 1.
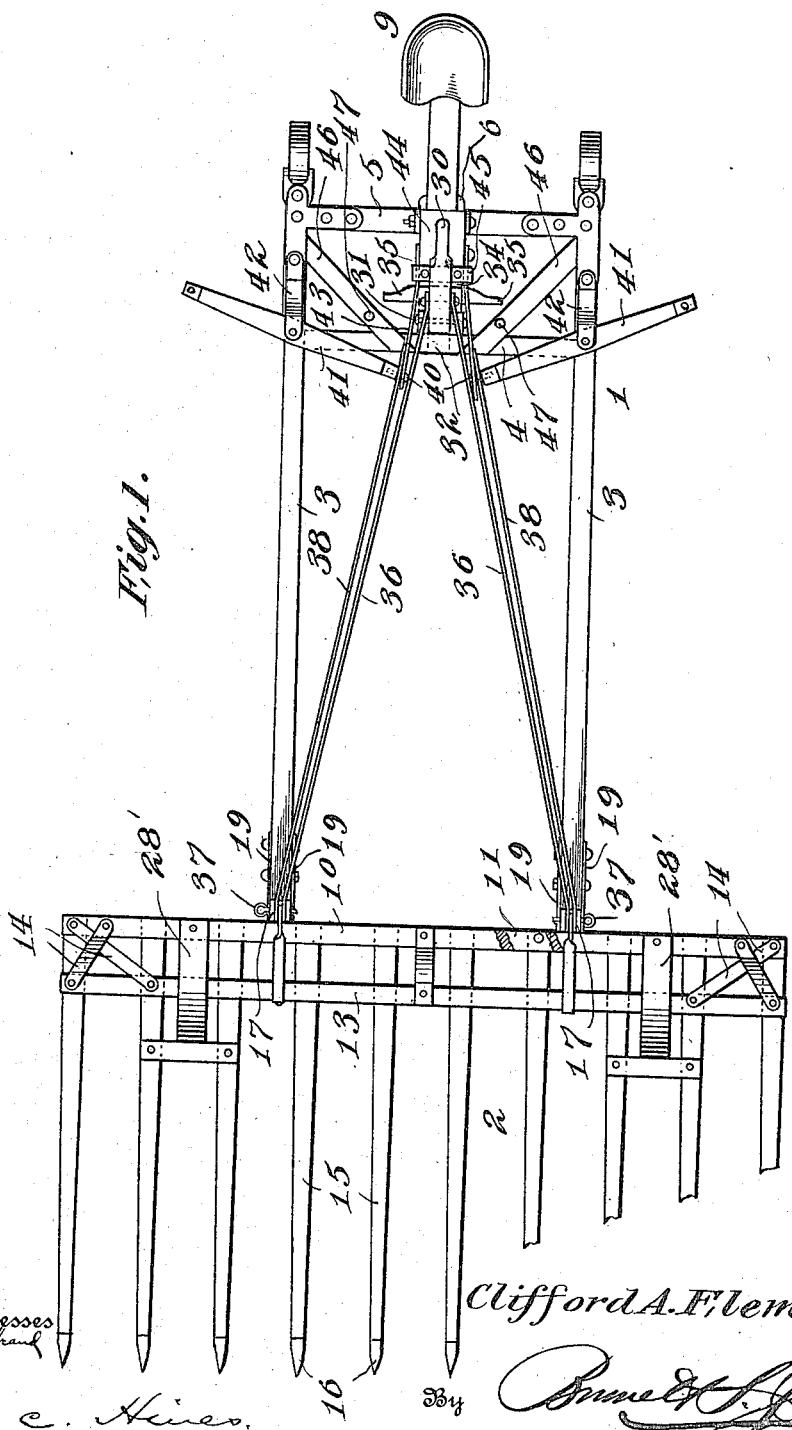
Fig.1.
Witnesses
N.V.Lybrand
C. C. Hines.
Inventor
Clifford A. Fleming
By
Attorney.

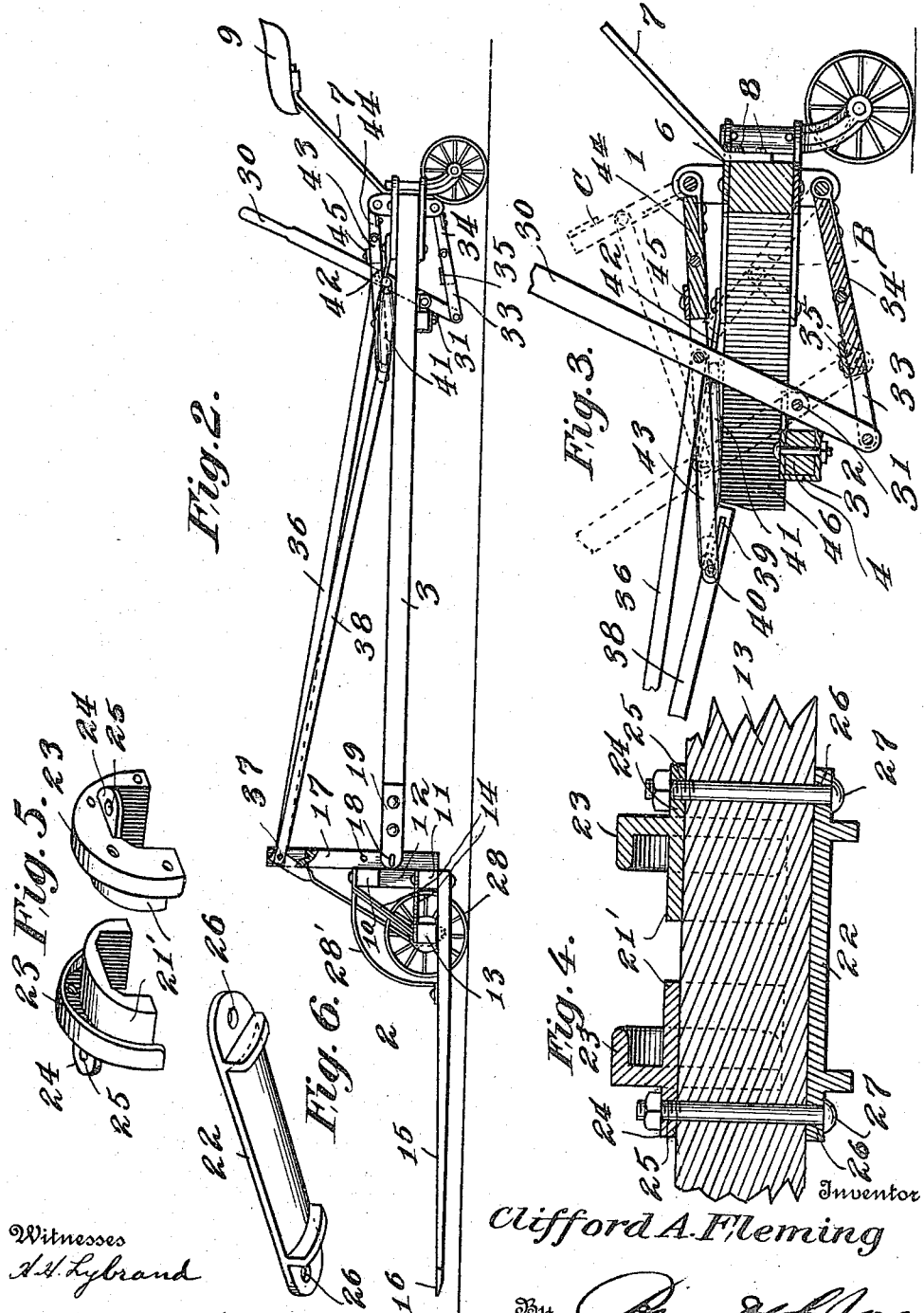

UNITED STATES PATENT OFFICE.

CLIFFORD A. FLEMING, OF HUNTSVILLE, MISSOURI.

HAY-RAKE.

1,165,863.

Specification of Letters Patent.

Patented Dec. 28, 1915.

Application filed May 12, 1911. Serial No. 626,711.

*To all whom it may concern:*

Be it known that I, CLIFFORD A. FLEMING, a citizen of the United States, residing at Huntsville, in the county of Randolph and State of Missouri, have invented certain new and useful Improvements in Hay-Rakes, of which the following is a specification.

This invention relates to rakes and particularly to one including a push frame and a pivoted rake head, the object of the invention being to provide effective mechanism for normally holding the head in lowered or collecting position, and multiple means whereby the rake head can be moved to its elevated or carrying position both by manual power and by the force of the draft animals.

Another object of the invention is to provide improved means operable through the draft devices by the draft animals at the will of the operator to elevate the rake head.

Another object of the invention is to provide locking mechanism for normally holding the draft devices against operative movement.

A still further object of the invention is to provide means whereby the rake head can be elevated manually without affecting the draft-animal-controlled head-operating means.

Another object of the invention is to provide means whereby the full weight of the operator may be utilized as means for lifting the rake head to the carrying position.

In the drawings forming a portion of this specification and in which like numerals of reference indicate similar parts in the several views, Figure 1 is a plan view of the rake; Fig. 2 is a side view thereof; Fig. 3 is a longitudinal section on line 3—3 of Fig. 1, parts being shown in elevation for the purpose of clearness; Fig. 4 is a section through a portion of the axle showing one of the wheel boxes applied thereto; Fig. 5 is a perspective view of the sand band sections of the journals; and Fig. 6 is a perspective view of the lower section of the journal.

My improved rake comprises a push frame 1 and a rake head 2, the former including the parallel longitudinal bars 3 which are connected with each other, preferably adjacent to their rear ends, by the connecting bars 4 and 5, the latter having a bracket 6 secured thereto through which extends the lower end of the seat spring 7, the said lower end of the spring being disposed at the rear of the bar 5 and secured thereto by the fastening device 8. This spring is disposed in axial alinement with the push frame and secured thereon is a suitable seat 9.

The rake head comprises superimposed bars 10 and 11 which are connected with each other by the standards 12. The lower bar 11 is disposed in the same general plane with the axle 13, being connected therewith by the braces 14. Lifting and collecting tines 15 are secured at their rear ends to the bar 11 and the axle 13 of the push frame, and, as illustrated, these tines have secured thereto at their forward ends relatively sharp steel points 16. Vertical posts 17 extend upwardly from the rake head, and, as shown, each is provided with a vertical series of adjusting openings 18. The push frame bars 3 are provided with brackets 19 which are adapted to adjustably receive the posts 17 of the rake head, the said brackets having passages 20 therein for interchangeable association with the passages 18, a retaining pin 21 being employed for holding the brackets operatively adjusted at different elevations on the posts, as clearly shown.

The wheel journals on the axle 13 each include upper companion sections 21' which are identically constructed and a lower section 22, the latter being disposed beneath the axle and the former being arranged substantially in embracing relation to the axle, as clearly shown in Fig. 4 of the drawings. The upper sections are provided with dust guards in the form of inwardly extending flanges 23 which are adapted to extend over the hub of the wheel and to protect the same against dust or foreign matter. The upper sections 21 are provided with horizontal ears 24 which are perforated, at 25, the perforations being disposed in line with similar perforations 26 in the ends of the sections 22. Fastening bolts or the equivalent thereof extend through the axle and through the alining perforations 24 and 26, as shown. The supporting wheels 28 which are operatively mounted on the journals just described are partly embraced by guards 28', the upper ends of the guards being secured to the bar 10 of the rake head and the lower ends of the guards being secured to the tines 15. These guards operate to protect the supporting wheels 28 against the hay when collected by the tines.

A manually operated lever 30 is pivoted, at 31, to the bracket 32 on the cross bar 4 of the push frame. The actuating end of the lever is located immediately in advance of the controller's seat 9, so it may be conveniently grasped by the hand and operated when desired. A portion of the lever extends below the bracket 32, the forward ends of the lock links 33 being pivoted to such portion, as shown. The rear ends of the links are pivoted to a foot lever 34 which is pivotally supported upon the rear bar 5 of the push frame. The lever 34 has mounted thereon foot extensions or brackets 35 against which the feet of the operator may be placed so as to hold the lock links against breaking upwardly on the carrying movement of the rake. Forwardly diverging links 36 are pivoted at their front ends to the pins 37 on the vertical posts 17 of the rake head. The rear ends of the links 36 are pivoted to the controlling lever 30 at 37'. Similar links 38 are also pivoted at their front ends to the pins 37, and as illustrated, the rear ends of the links are provided with elongated longitudinally arranged slots 39 through which the inwardly extending pins 40 at the inner ends of the draft levers 41 extend. These levers (to the outer ends of which the usual swingletrees or doubletrees are pivotally connected) are pivoted in suitable brackets 42 on the side bars 3 of the push frame. Locking links or members 43 are pivoted at their forward ends on the pins 40 and at the rear ends the said members are pivoted to the sides of an upper foot lever 44, the same being pivotally supported upon the bar 5 of the push frame. When the lever 44 is in its depressed position the rear pivots of the members 43 are disposed in the same general plane with the pins 40, and in view thereof the inner ends of the draft levers 41 will be held in a forward position and said levers fixed against pivotal movement under the pull of the draft animals. A stop 45 extends across the forward end of the lever 44 and is adapted to contact with the members 43 to hold them against breaking downwardly below their normal or locking positions. Brace members 46 connect the front and rear bars 4 and 5 with each other, and, as shown, these members are provided with vertical stops 47 which are disposed in the path of pivotal movement of the levers 41, to limit their movements when released for action and pull is applied thereto by the draft animals to raise the rake head.

Referring more particularly to Fig. 3 of the drawings, it will be seen that when the parts are in their normal position the axes of the pin 40, pivot of the opposite end of the link 43, and pivot of the lever 44 are in alinement, so that force applied to that end of the link 43 connected to the pins of the doubletrees will be in a direction through the centers of the pivots of the links and the lever with the result that independent movement between the links and the lever is prevented. To accommodate the swinging movement between the lever 44 and the links 43, the toe of the operator must exert pressure on the under surface of the stop 45 for throwing the pivots of the outer end of the links out of alinement with the pivot of the lever and the pin 40. Immediately this takes place, the pressure exerted on the outer ends of the doubletrees by the draft animals causes the links and the lever to assume the dotted line position shown in Fig. 3. The same action takes place with the lever 30, links 33 and lever 34.

From the foregoing description, it will be seen that when the collector is not carrying a load the same can be manually elevated by the lever 30 and locked in this position by the lever 34 and lock links 33. When the collector is carrying a load the operator can simply exert pressure on the under surface of the stop 45 so as to slightly move the pivot of the outer ends of the lock links 43 out of alinement with the pivot of the lever and the pin 40, with the result that this movement is continued by the draft animal until the collector reaches its elevated position.

I claim as my invention:

1. A rake comprising a draft frame, a tilting head mounted thereon, a lever pivoted to the draft frame, a set of links pivoted at their inner ends to the lever and at their outer ends to the head, means for releasably holding the lever rigid with relation to the frame, draft levers supported upon the draft frame, a second set of links pivoted at their forward ends to the head and movably connected at their opposite ends to the draft levers, and means connected with said second set of links for holding the draft levers against movement in a direction to actuate said links.

2. A rake comprising a swingingly mounted collector, a draft frame connected thereto, a pair of doubletrees pivoted to and arranged transversely of said frame, a pin projecting from the inner end of each doubletree, links, each of which has one extremity pivotally connected to the collector and its opposite extremity provided with a slot, the walls of which engage one of the pins, a foot lever pivotally connected at one end to the frame and normally lying substantially in a horizontal plane, a stop projecting from opposite sides of said lever, and a pair of locking links each pivoted at one extremity of an intermediate portion of said lever underlying said stop and loosely engaging one of said pins.

3. A rake comprising a swingingly mounted collector, a draft frame connected thereto, a seat secured to that end portion of the frame opposite said collector, a pair of doubletrees pivoted to and arranged transversely of said frame, a pin projecting from the inner end of each doubletree, links, each of which has one extremity pivotally connected to the collector and its opposite extremity provided with a slot, the walls of which engage one of the pins, a foot lever, a stop projecting from opposite sides of said lever, and a pair of locking links each pivoted at one extremity to an intermediate portion of said lever, underlying said stop and loosely engaging one of said pins for holding its associated doubletree at an inclined position with relation to said frame, said foot lever being pivotally mounted on said frame and adjusted to swing toward said seat when said doubletrees assume a free position.

In testimony whereof I affix my signature in presence of two witnesses.

CLIFFORD A. FLEMING.

Witnesses:
W. L. DAMERON,
JIM L. HAMMETT.

Copies of this patent may be obtained for five cents each, by addressing the "Commissioner of Patents, Washington, D. C."